(12) United States Patent
Gi et al.

(10) Patent No.: US 8,061,776 B2
(45) Date of Patent: Nov. 22, 2011

(54) WALK-IN AND FOLDING APPARATUS FOR SEAT

(75) Inventors: Chang Ju Gi, Seoul (KR); Young Bok Sung, Hwaseong-si (KR); Hyeong Jun Kim, Anyang-si (KR); Jae Hyun Na, Ansan-si (KR); Tae Hoon Lee, Hwaseong-si (KR); Jong Eup Choi, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 239 days.

(21) Appl. No.: 12/511,242

(22) Filed: Jul. 29, 2009

(65) Prior Publication Data
US 2010/0133886 A1 Jun. 3, 2010

(30) Foreign Application Priority Data
Dec. 1, 2008 (KR) .................. 10-2008-0120700

(51) Int. Cl.
*B60N 2/02* (2006.01)
*B60N 2/04* (2006.01)
(52) U.S. Cl. .................. 297/341; 297/378.12
(58) Field of Classification Search ............ 297/378.12, 297/378.14, 341
See application file for complete search history.

(56) References Cited

U.S. PATENT DOCUMENTS

| 6,832,815 B2* | 12/2004 | O'Connor ............... 297/378.12 |
| 7,036,885 B2* | 5/2006 | Ganot et al. ............ 297/378.12 |
| 7,686,398 B2* | 3/2010 | Yokoyama ................... 297/341 |
| 2006/0145524 A1* | 7/2006 | Fischer et al. ........... 297/378.12 |
| 2007/0018492 A1* | 1/2007 | Becker et al. ............ 297/378.12 |

FOREIGN PATENT DOCUMENTS
KR 10-2006-0074413 A 7/2006
* cited by examiner

*Primary Examiner* — Milton Nelson, Jr.
(74) *Attorney, Agent, or Firm* — Morgan, Lewis & Bockius LLP

(57) ABSTRACT

A walk-in and folding apparatus for a seat includes a locking link installed on a cushion frame by an elastic hinge, and connected with a locking unit via a first wire so as to, upon rotation, release the locked locking unit, and a walk-in pin installed on a frame of a seat back by another elastic hinge, protruding towards the locking link so as to, upon folding of the frame of the seat back, force the locking link to rotate, and connected with a folding lever in such a manner as to rotate in association with the same so as to, upon a folding action caused by operation of the folding lever, rotate so that it does not interfere with the locking link.

11 Claims, 9 Drawing Sheets

FIG. 9

WALK-IN AND FOLDING APPARATUS FOR SEAT

CROSS-REFERENCE TO RELATED APPLICATION

The present application claims priority to Korean Patent Application Number 10-2008-0120700 filed Dec. 1, 2008, the entire contents of which application is incorporated herein for all purpose by this reference.

BACKGROUND OF THE INVENTION

1. Field of the Invention

The present invention relates, in general, to a walk-in and folding apparatus for a seat in which a recliner or a locking device is released by a walk-in lever of a frame of a seat back and a folding lever of a cushion frame, enabling actions of walk-in and folding to operate independently.

2. Description of Related Art

Generally, a seat of a vehicle consists of a reclining seat back against which an occupant reclines and a seat cushion on which an occupant seats. A vehicle requires space so that occupants or articles with a variety of sizes may get on.

To satisfy such a requirement, according to the prior art, the seat back is configured such that it is folded and its folded angle is freely regulated. However, recently, in the case of 3-door car or a coupe, a front seat is slid forwards so as to increase a boarding area in order to facilitate boarding of a rear seat occupant. Further, along with the sliding, the seat back is folded over the seat cushion to maximize the boarding space. Such a sliding motion of the front seat is called a "walk-in function".

Meanwhile, in the case of a SUV or a RV, rear-side space is required as trunk space. In this case, the seat back of the rear seat is configured so that the seat back is completely folded flat over the seat cushion, increasing the receiving space. Such a motion of the seat is called a "folding function".

Now, in reality it is required to incorporate such walk-in and folding functions into a single seat such that the respective functions are independently implemented.

However, a walk-in and folding apparatus for a seat had problems of high manufacturing costs, frequent occurrences of malfunction, and of being incompatible with diverse kinds of cars because of the existence of too many parts.

Thus, a walk-in and folding apparatus for a seat, which can implement both functions with the minimum number of parts, and further can be compatible with the respectively different kinds of cars, is needed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to propose a walk-in and folding apparatus for a seat in which walk-in and folding functions can be implemented completely independently of each other because of an adaptation of a minimum number of parts, and the operation thereof.

In an aspect of the present invention, the walk-in and folding apparatus for a seat, in which a recliner disposed between a seat back frame and a cushion frame is selectively released by a walk-in lever to permit folding action of the seat back, and a locking unit and the recliner are released by a folding lever to permit a walk-in action of the seat back frame, may include a shaft rotatably mounted to the cushion frame and the seat back frame and being fastened to the recliner, a locking link rotatably coupled to the shaft and biased by a first elastic member, a first end portion of the locking link being connected to the locking unit via a first wire so as to, upon rotation of the locking link, release a locked state of the locking unit to permit the seat to slide in one direction, and an actuating lever, one end portion of which is pivotally coupled to the seat back frame and biased toward the locking link by a second elastic member, and the other end portion of which includes a walk-in pin, the other end portion of the actuating lever being connected to the folding lever, wherein the walk-in pin is selectively engaged with the locking link according to operation of the folding lever such that, upon folding of the seat back frame with operation of the walk-in lever, the walk-in pin is engaged with the locking link to rotate the locking link to release the locked state of the locking unit, but, upon folding of the seat back frame with operation of the folding lever, the walk-in pin is disengaged from the locking link and the locking unit is unlocked such that the seat back frame can be folded with respect to the shaft and be movable in the one direction.

The folding lever may be rotatably coupled to the cushion frame.

The locking link may include a pressed section formed on a second end portion thereof and configured to be selectively pressed by the walk-in pin according to the operation of the folding lever.

The pressed section of the locking link may be of a circular sector form with an arc of a predetermined length, and when the folding lever is operated, the walk-in pin passes over the arc of the pressed section so that the walk-in pin is disengaged from the locking link, wherein the cushion frame is provided with a latching groove, and when the folding lever is operated, the walk-in pin passes over the locking link upon folding the seat back frame, and is latched onto the latching groove, to maintain the seat in a folded state.

The cushion frame may be provided with a latching groove, and when the folding lever is operated, the walk-in pin passes over the locking link upon folding the seat back frame, and is latched onto the latching groove, to maintain the seat in a folded state.

The seat back frame may be provided with a first slot to slidably receive the walk-in pin therein, the walk-in pin being connected with the folding lever through the first slot by a second wire.

The recliner may be coupled to a second slot formed in the folding lever by a link.

The folding lever may be installed on a side end of the cushion frame through a hinge such that one end of the folding lever is connected with the recliner by a link, and is connected with the walk-in pin by a wire so as to, upon rotation, release the recliner and draw the second wire to rotate the walk-in pin.

The cushion frame may be provided on both sides of the seat back frame with the recliners, each being fastened to the shaft, and includes a connection lever formed to the shaft, one end of the connection lever being connected to the walk-in-lever by a third wire, such that upon operation of the walk-in lever the recliners are released from the cushion frame, wherein the folding lever and the locking link are installed on one side of the cushion frame, a second side of which is provided with the connection lever configured to selectively connect the recliner with the cushion frame.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
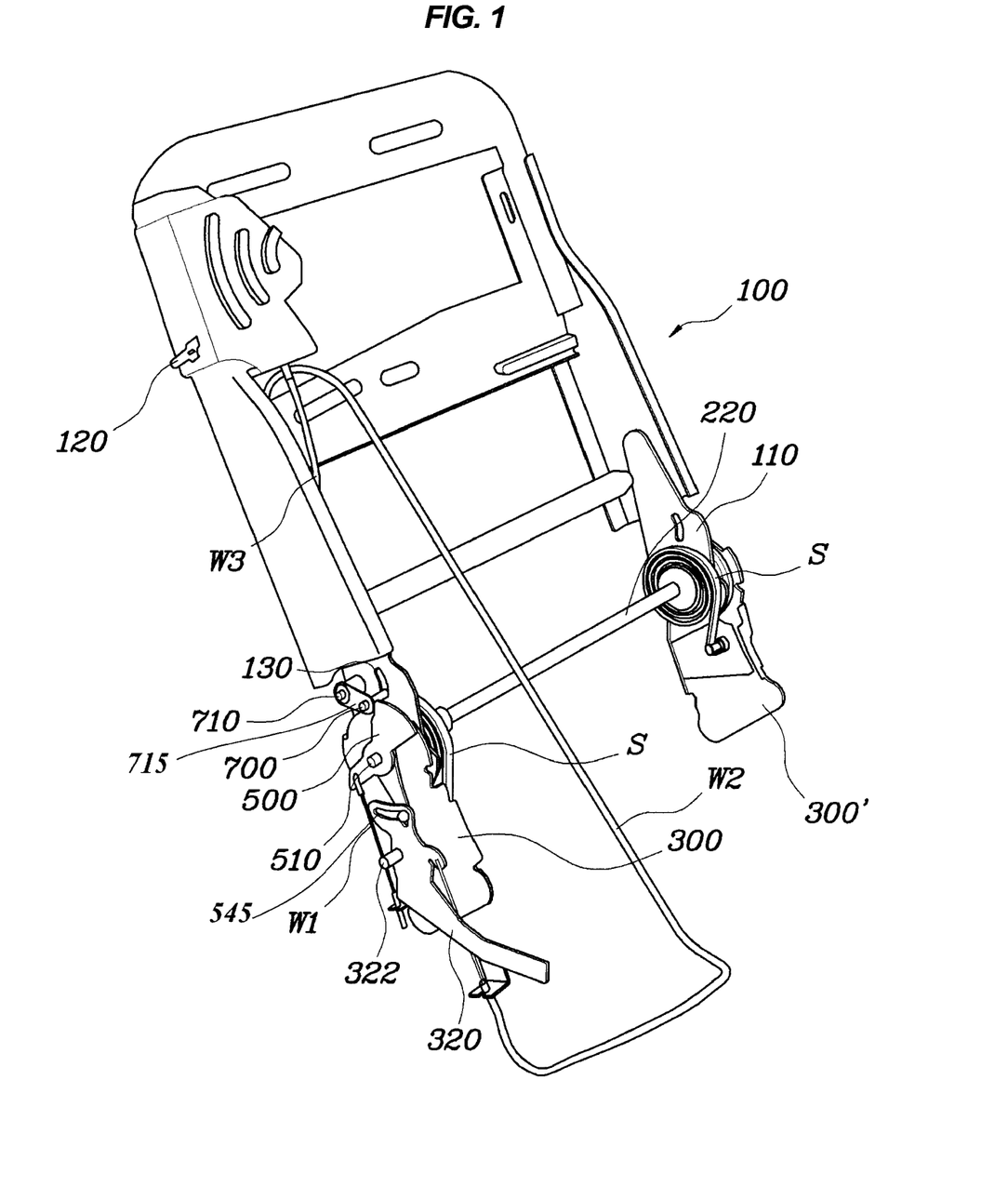
FIG. 1 is a perspective view illustrating an exemplary walk-in and folding apparatus for a seat according to the present invention.

FIG. 1 is a perspective view illustrating a walk-in and folding apparatus for a seat according to various embodiments of the present invention. In the walk-in and folding apparatus, a recliner 200 or a locking unit is released by a walk-in lever 120 of a frame 100 of a seat back and a folding lever 320 of a cushion frame 300, enabling walk-in and folding actions to operate independently The walk-in and folding apparatus includes a locking link 500 installed on the cushion frame 300 by means of an elastic hinge 510, and connected with the locking unit via a first wire W1 so as to, upon rotation, release the locked locking unit, and a walk-in pin 700 installed on the frame 100 of the seat back by means of another elastic hinge 710, protruding towards the locking link 500 so as to, upon folding of the frame 100 of the seat back, force the locking link 500 to rotate, and connected with the folding lever 320 in such a manner as to rotate in association with the same so as to, upon folding action by the operation of the folding lever 320, rotate so that it does not interfere with the locking link 500.

The frame 100 of the seat back is rotatably connected to the cushion frame 300. The connection part is provided with the recliner 200 between the frame 100 of the seat back and the cushion frame 300. The frame 100 of the seat back extends downwards, diverging into two sections, and its end is rotatably connected to the cushion frame 300 directly or by means of a connection bracket 110. The connection bracket 110 is fixed to the frame 100 of the seat back and rotates along with the same. The connection bracket 110 is hereinafter referred to as the frame of the seat back because it is included in the frame of the seat back.

The frame 100 of the seat back is provided with the walk-in lever 120 which upon operation by an occupant, carries out a walk-in action, and the cushion frame 300 is provided with the folding lever 320 which upon operation by an occupant, carries out a folding action of the seat back. During the folding action, the recliner 200 installed between the frame 100 of the seat back and the cushion frame 300 is released, and the seat back is folded towards a cushion. The seat back is continuously forced against the cushion by a spiral spring S, and the recliner 200 locks or unlocks (releases) the rotation of the seat back. Upon walk-in action, the seat back is folded towards the cushion by releasing of the recliner, and at the same time, the locking unit below the cushion is released, allowing the cushion to slide forward in a car. A rail is provided on the floor of a car, and the cushion is provided such that it is slidable along the rail while being forced forward by a spring. The locking unit locks or unlocks sliding of the cushion. Thus, when the walk-in lever 120 operates, the seat back is folded towards the cushion and at the same time, the cushion slides forward in a car.

The locking link 500 is installed on the cushion frame 300 by means of the elastic hinge 510, and is connected with the locking unit via the first wire W1 so as to, upon rotation, release the locked state of the locking unit. The elastic hinge is a structure which is connected to a hinge pin such that it is elastically rotatable by the hinge pin so that it can return to its original position after rotation.

The walk-in pin 700 is installed on the frame 100 of the seat back with an actuating lever 715 having another elastic hinge 710 therein. The walk-in pin 700 protrudes towards the locking link 500 so as to, upon folding of the frame 100 of the seat back, force the locking link 500 to rotate, and is connected with the folding lever 320 in such a manner as to rotate in association with the same so as to, upon folding action by the operation of the folding lever 320, rotate so that it does not interfere with the locking link 500.

Upon folding action of the seat, the frame 100 of the seat back rotates, and then the walk-in pin 700 also rotates so as to press the locking link 500 of the cushion frame 300. Then, the locking link 500 is forced to rotate, and draws the first wire W1 to unlock the locking unit of the cushion, so that the cushion can slide. However, since such an operation should be performed only when the walk-in lever 120 has been moved, upon operation of the folding lever 320, although the walk-in pin 700 rotates upwards to fold the seat back, the walk-in pin does not interfere with the locking link 500. The locking link 500 is installed on the cushion frame 300 at its center portion 520 by means of the elastic hinge 510. One end 540 of the locking link is connected with the first wire W1, and another end thereof is provided with a pressed section 560 against which the walk-in pin 700 presses. The pressed section 560 is of the form of a circular sector having an arc of a certain length, and upon operation of the folding lever 320, the walk-in pin 700 rotates upwards and then passes along the arc of the pressed section 560.

The frame 100 of the seat back is provided with a slot 130 towards the walk-in pin 700, which is connected with the folding lever 320 through the slot 130 by means of a second wire W2, the cushion frame 300 is provided with a latching groove 342, and when the folding lever 320 operates, the walk-in pin 700 rotates upwards along the slot 130, passes through the locking link 500 as the seat folds, and is latched on the latching groove 342, maintaining the seat folded.

The cushion frame 300 is provided on both sides with the recliners 200, each being connected with a shaft 220 so as to, upon rotation of the shaft 200, be fixed or released. In the exemplary embodiment of FIG. 1, the walk-in lever 120 is connected with the shaft 220 by means of a third wire W3 so as to, upon operation of the walk-in lever 120, allow the shaft 220 to rotate the recliner 200 to release the frame 100 from the cushion frame 300 to carry out the folding action.

The operation of the walk-in and folding apparatus will now be described in brief Upon rotation of the walk-in lever 120, the shaft 220 rotates by means of the third wire W3 to unlock both the recliners 200, folding the seat back. Then, the walk-in pin 700 presses against the pressed section 560 of the locking link 500, which in turn draws the first wire W1 to unlock the locking unit below the cushion, allowing the cushion to slide.

The folding lever 320 is installed on a side end of the cushion frame 300 through the elastic hinge 322 and includes a slot 545 such that the slot 545 of the folding lever 320 is connected with a link 326 coupled to the recliner 200, and the other end of the folding lever 320 is connected with the walk-in pin 700 by means of a wire W2 so as to, upon rotation, release the recliner 200 and draw the second wire W2 to rotate the walk-in pin 700.

Upon operation of the folding lever 320, it draws the second wire W2 and at the same time, rotates the shaft 220 via a link 326. Upon rotating the link 326, the frame 100 is unlocked from the cushion frame 300 by the released recliner 200 and upon drawing of the second wire W2, the walk-in pin 700 rotates upwards along the slot 130. Accordingly, upon folding action of the seat back, the walk-in pin 700 passes along an upper portion of the arc of the pressed section 560 while keeping away from the locking link 500. Thus, at this time, only a folding action is performed because the locking link 500 is immobile, but the locking unit continuously locks the cushion. When the folding action has finished, the walk-in pin 700 is fixedly latched onto the latching groove 342 of the cushion frame 300 by the elastic hinge 710, fixedly maintaining the folded state.

Figure 2:
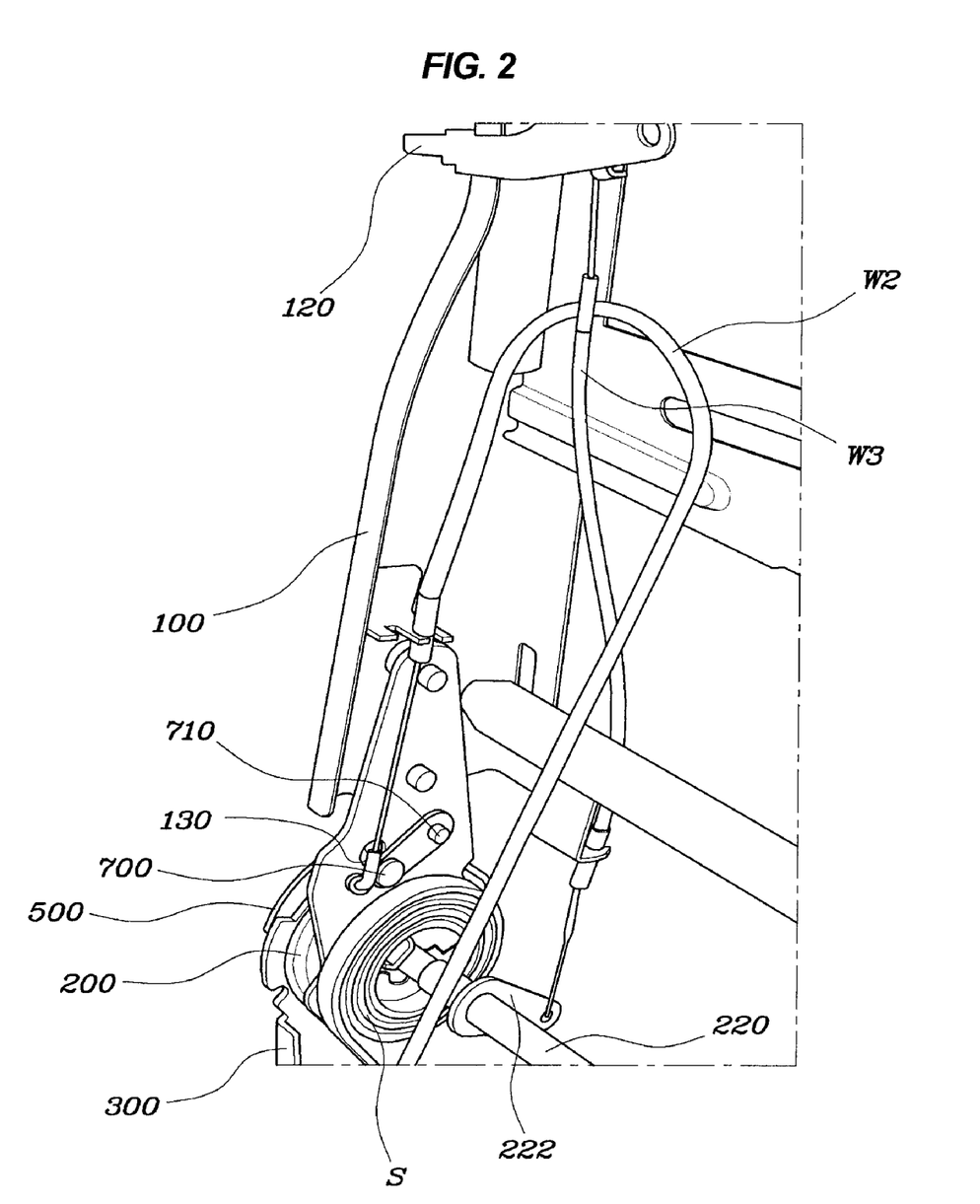
FIG. 2 is a perspective view illustrating a major part of the exemplary walk-in and folding apparatus shown in FIG. 1.

FIG. 2 is a perspective view illustrating a major part of the walk-in and folding apparatus according to various embodiments of the invention. The third wire W3 connected to the walk-in lever 120 is fixed to the shaft 220 by means of a connection lever 222, and the walk-in pin 700 connected to the second wire W2 rotates upwards through the slot 130.

Figure 3:
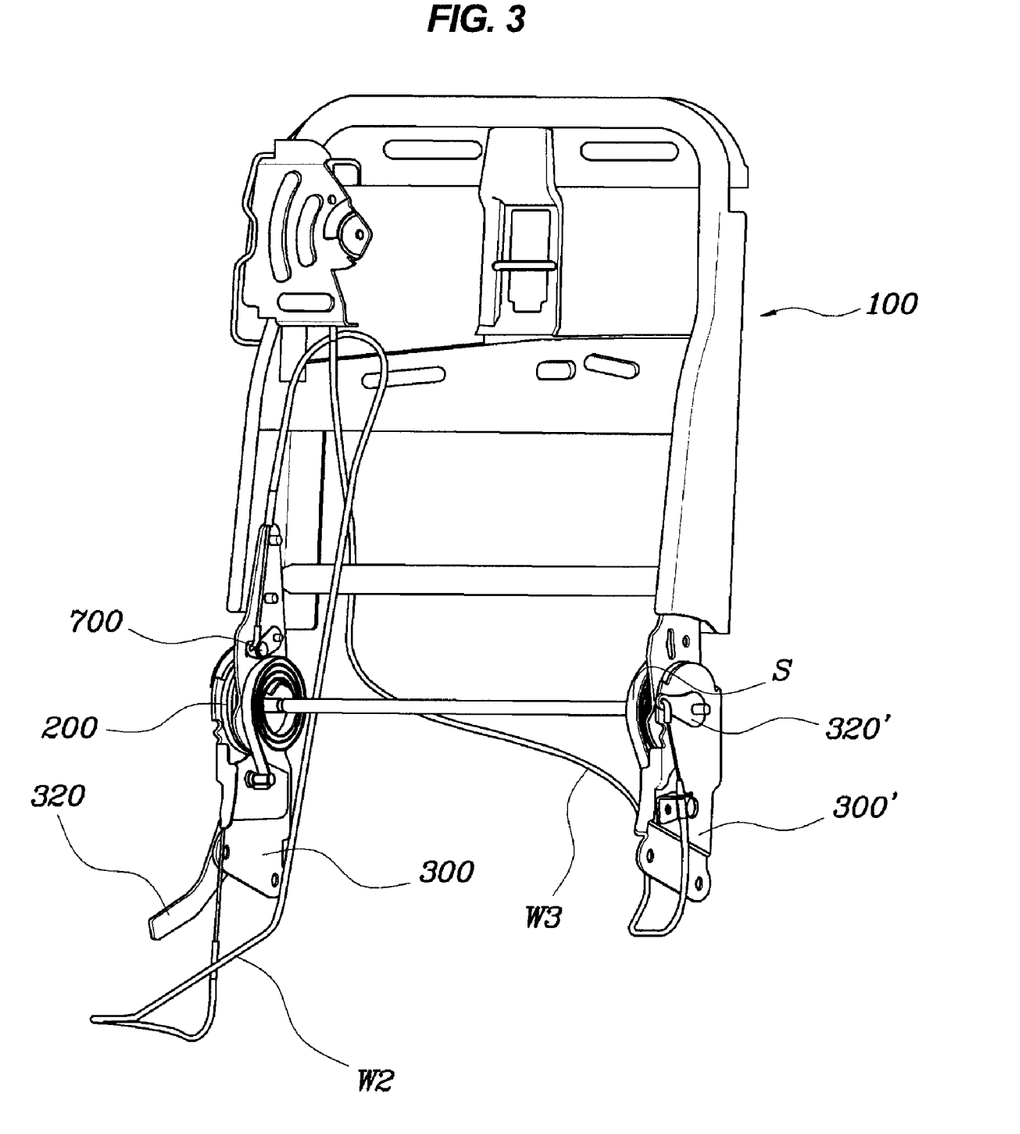
FIG. 3 is a perspective view illustrating an exemplary walk-in and folding apparatus for a seat according to the present invention.

FIG. 3 is a perspective view illustrating a walk-in and folding apparatus for a seat according to other embodiments of the present invention. In various embodiments, the folding lever 320 and the locking link 500 are installed on one side 300 of the cushion frame, another side 300' of which is provided with a connection lever 320' connected with the recliner 200' so as to rotate the recliner 200' and the third wire W3 of the walk-in lever 120 is connected with the connection lever 320' so as to, upon rotation of the connection lever 320' by operation of the walk-in lever 120, render the recliner 200' released, allowing the frame 100 to rotate.

Figure 4:
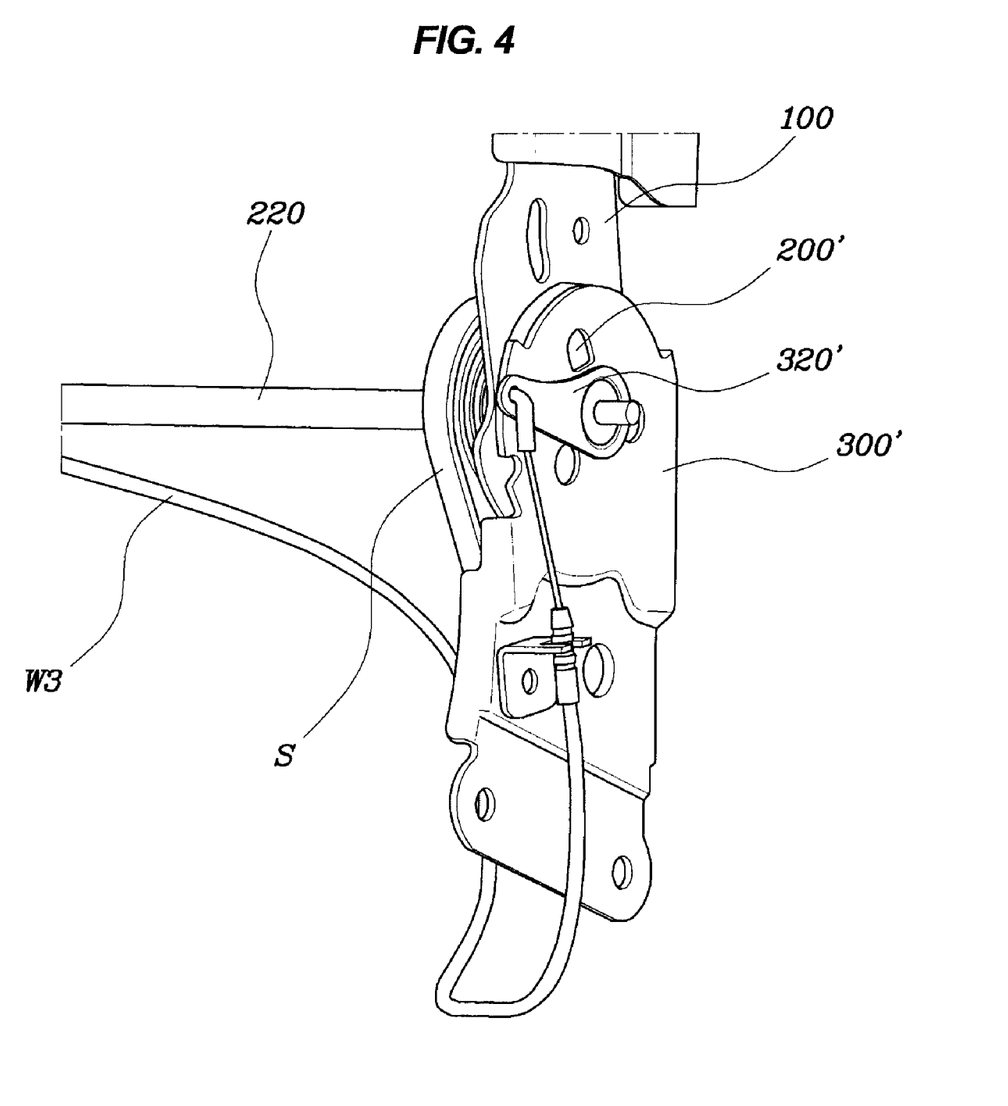
FIG. 4 is a perspective view illustrating a cushion frame of the walk-in and folding apparatus shown in FIG. 3.

FIG. 4 illustrates the connection between the connection lever 320' and the third wire W3. Upon operation of the walk-in lever 120, it rotates the connection lever 320' via the third wire W3, so that the recliner 200' in the cushion frame 300 is unlocked. When the recliner 200' is unlocked, the shaft also rotates so as to unlock another recliner 200 as well such that the frame 100 of the seat back can be folded.

Figure 5:
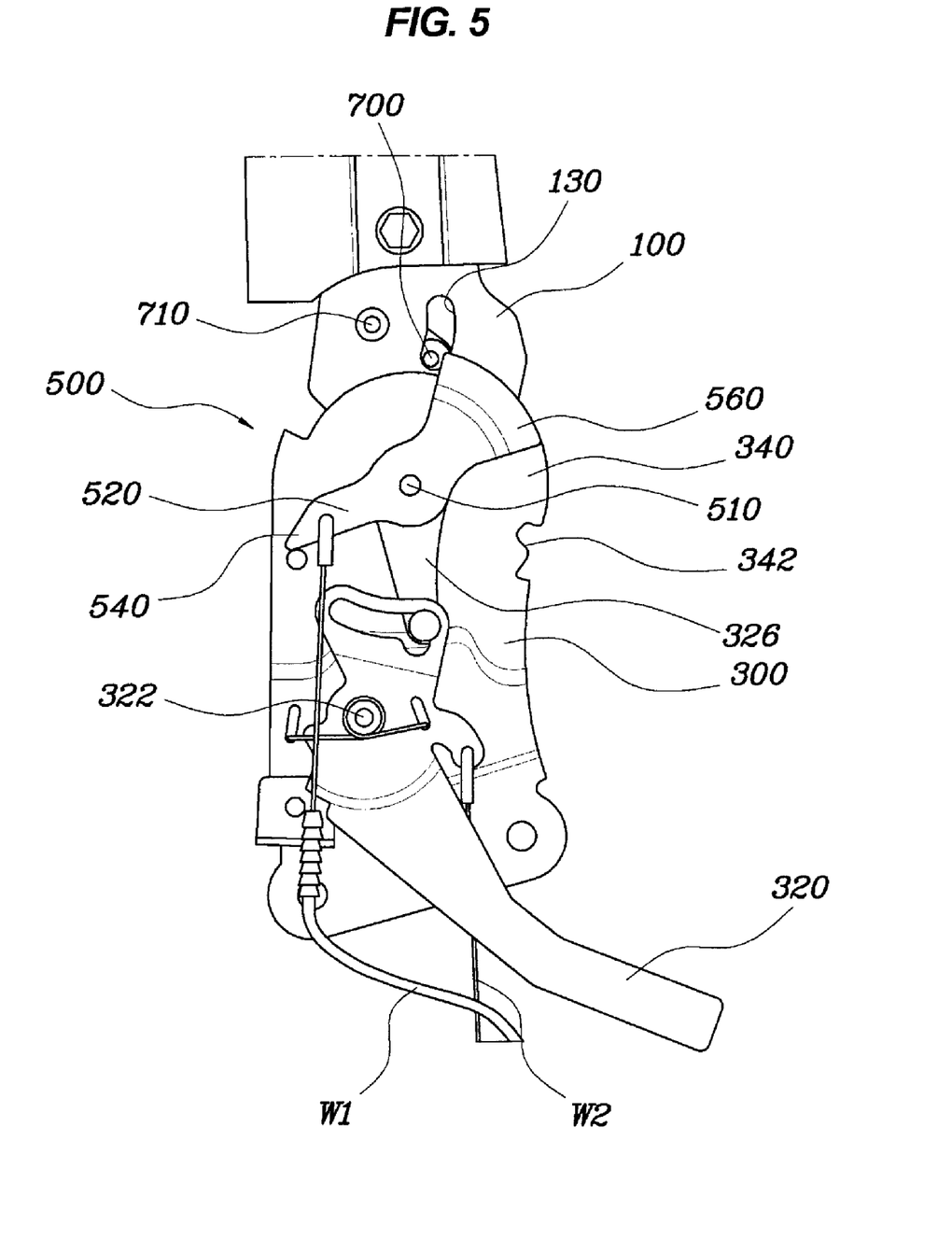
FIGS. 5 and 6 are views illustrating the operations of a walk-in action of the apparatus of FIG. 3.
Figure 6:
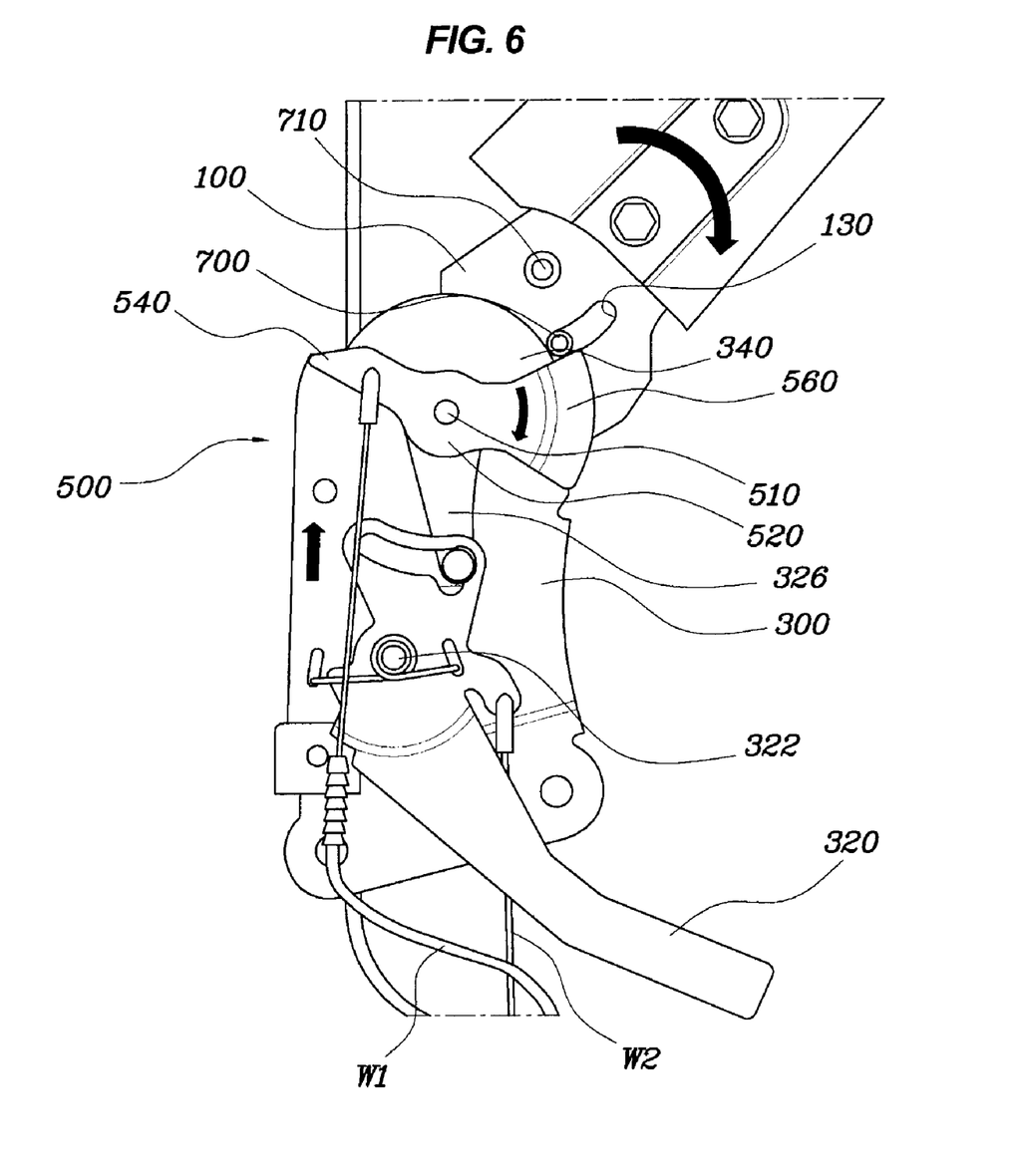

FIGS. 5 and 6 are views illustrating the operations of a walk-in action of the apparatus of FIG. 3. In the state of FIG. 5, upon operation of the walk-in lever 120, the recliner 200 is unlocked and thus a folding action is performed. This allows the frame 100 of the seat back and in turn the walk-in pin 700 to rotate. The walk-in pin 700 forces the locking link 500 to rotate and then draws the first wire W1. Drawing of the first wire W1 allows the locking unit below the cushion to be unlocked, so that the cushion slides, performing a walk-in action. FIG. 6 illustrates the locking link 500 having been pressed by the walk-in pin 700.

Figure 7:
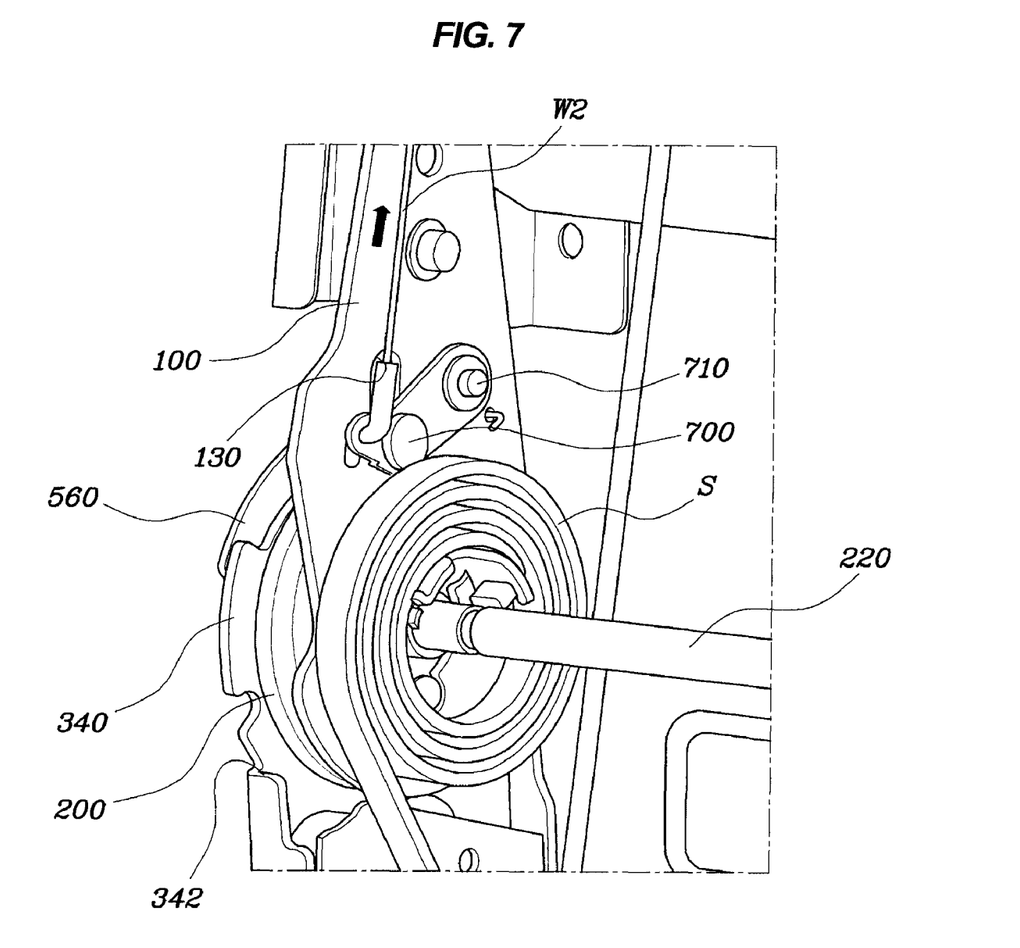
FIG. 7 is a perspective view illustrating a major part of the walk-in and folding apparatus shown in FIG. 3.

FIG. 7 is a perspective view illustrating a major part of the walk-in and folding apparatus shown in FIG. 3. When the walk-in pin 700 rotates upwards, it is preferably guided along a curved section. This is for performing smooth folding of the seat back. Thus, both the upper portion of the pressed section 560 of the locking link 500 and the upper portion 340 of the cushion frame 300 are of a circular sector form with the same arc. Further, the latching groove 342 is formed in the upper portion 340 of the cushion frame 300 so as to fix the walk-in pin 700.

Figure 8:
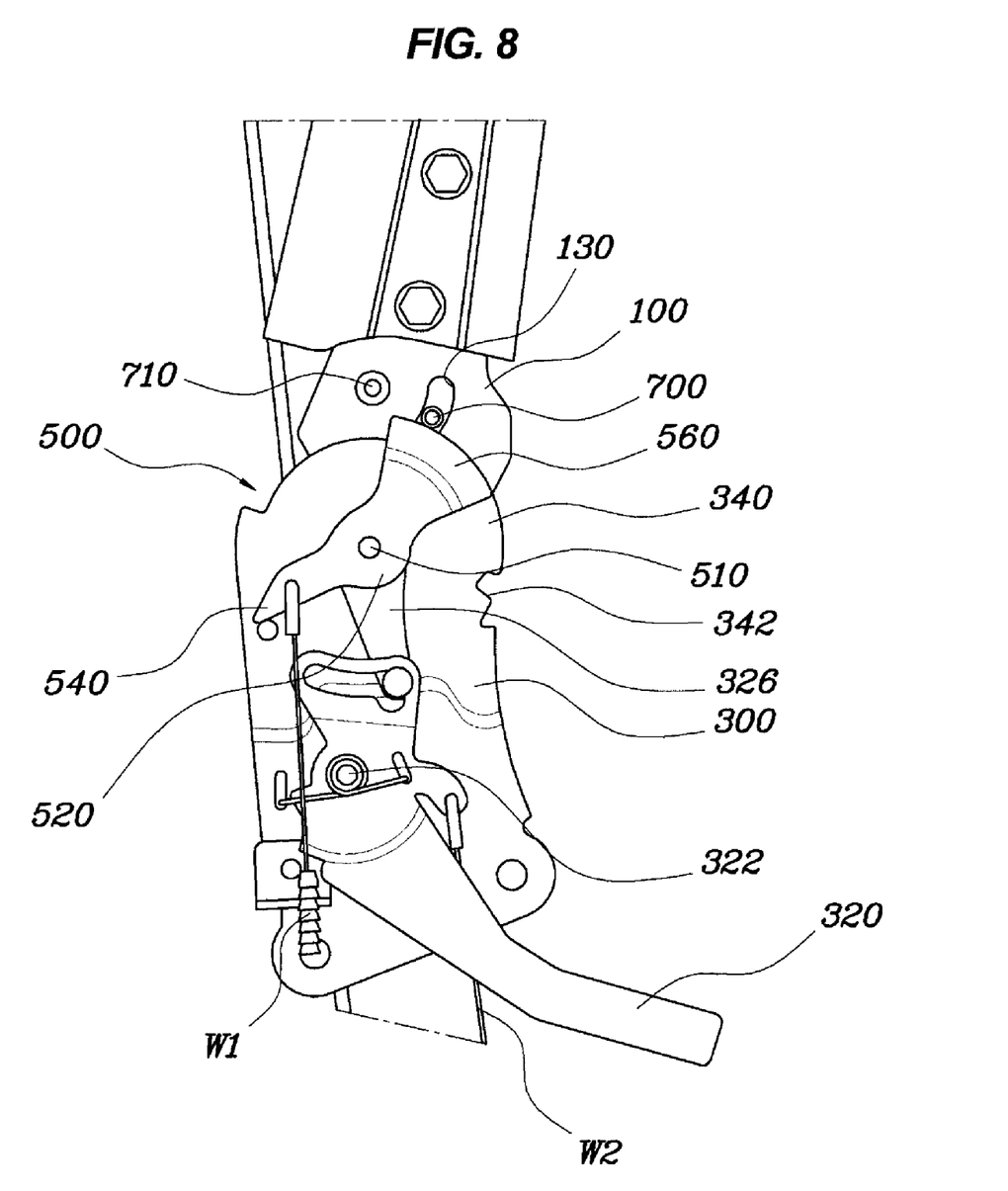
FIGS. 8 and 9 are views illustrating the operations of a folding action of the apparatus of FIG. 3.
Figure 9:
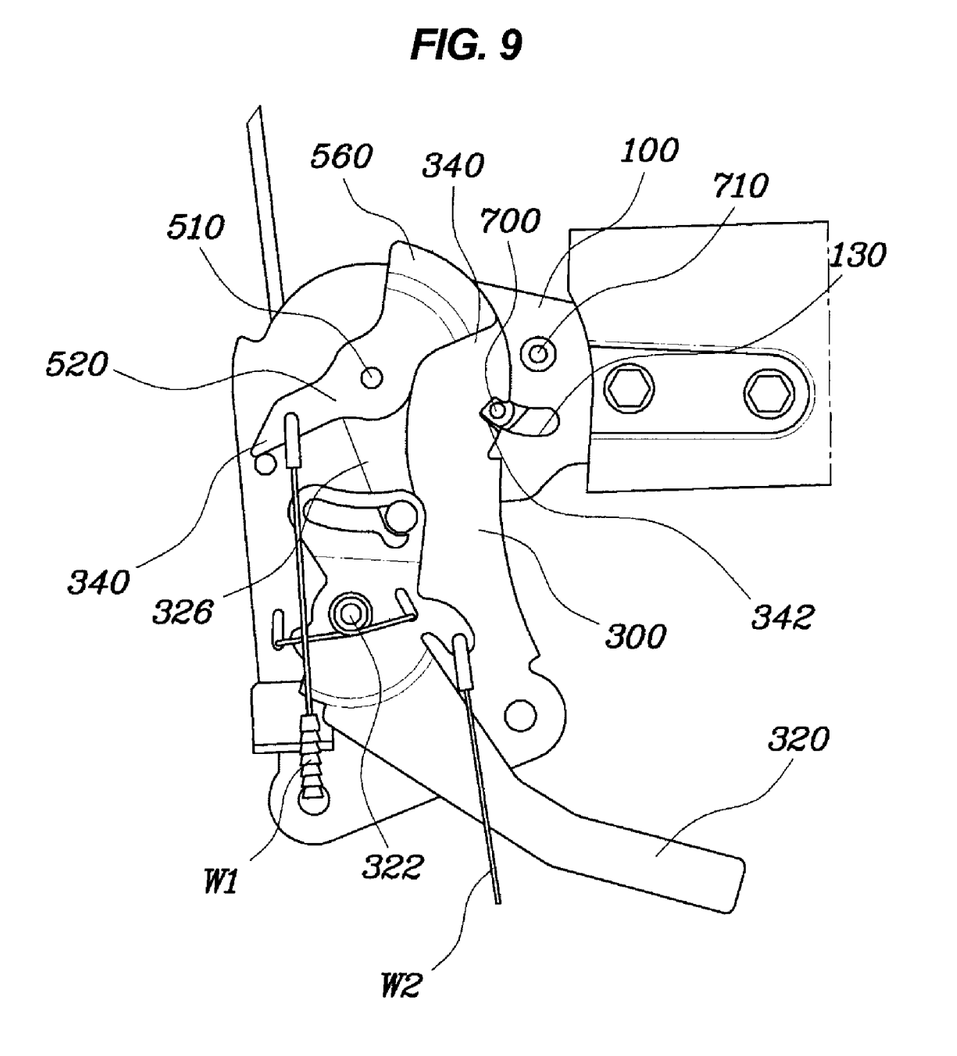

FIGS. 8 and 9 are views illustrating the operations of a folding action of the apparatus of FIG. 3. Upon operation of the folding lever 320, the folding lever 320 rotates the link 326 to unlock the recliner 200, performing the folding action of the seat back, and draws the second wire W2 so that the walk-in pin 700 rotates and rises along the slot 130. Despite the folding action of the seat back, the walk-in pin 700 having moved upwards passes along the upper portion of the pressed section 560 without pressing the pressed section 560, so that the first wire W1 does not move and the locking unit is also maintained locked, thereby carrying out only a folding action without a sliding action.

FIG. 9 illustrates the walk-in pin in the fixed state. The walk-in pin 700 passes over the locking pin 500, and moves furthermore so as to pass over the upper portion of the cushion frame 300. Then, the walk-in pin 700 is inserted into the latching groove 342 formed in the upper portion of the cushion frame 300. Upon being latched onto the latching groove 342, the walk-in pin 700 does not deviate from a position by the elastic hinge 710 of the walk-in pin 700, maintaining the folded state in a fixed state. In this state, upon operation of the folding lever 320, the walk-in pin 700 moves upwards again and thus deviates from the latching groove 342, so that the seat back rotates in a reverse direction and unfolds.

For convenience in explanation and accurate definition in the appended claims, the terms "upper", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:
1. A walk-in and folding apparatus installed in a seat, the apparatus comprising:
    a recliner disposed between a seat back frame and a cushion frame wherein the recliner is selectively released by a walk-in lever to permit folding action of a seat back, and wherein a locking unit and the recliner are released by a folding lever to permit a walk-in action of the seat back frame;

a shaft rotatably mounted to the cushion frame and the seat back frame and being fastened to the recliner;

a locking link rotatably coupled to the shaft and biased by a first elastic member, a first end portion of the locking link being connected to the locking unit via a first wire so as to, upon rotation of the locking link, release a locked state of the locking unit to permit the seat to slide in one direction; and an actuating lever, one end portion of which is pivotally coupled to the seat back frame and biased toward the locking link by a second elastic member, and other end portion of which includes a walk-in pin, the other end portion of the actuating lever being connected to the folding lever, wherein the walk-in pin is selectively engaged with the locking link according to operation of the folding lever such that, upon folding of the seat back frame with operation of the walk-in lever, the walk-in pin is engaged with the locking link to rotate the locking link to release the locked state of the locking unit, but, upon folding of the seat back frame with operation of the folding lever, the walk-in pin is disengaged from the locking link and the locking unit is unlocked such that the seat back frame can be folded with respect to the shaft and be movable in the one direction.

2. The walk-in and folding apparatus installed in a seat according to claim 1, wherein the folding lever is rotatably coupled to the cushion frame.

3. The walk-in and folding apparatus installed in a seat according to claim 1, wherein the locking link includes a pressed section formed on a second end portion thereof and configured to be selectively pressed by the walk-in pin according to the operation of the folding lever.

4. The walk-in and folding apparatus installed in a seat according to claim 3, wherein the pressed section of the locking link is of a circular sector form with an arc of a predetermined length, and when the folding lever is operated, the walk-in pin passes over the arc of the pressed section so that the walk-in pin is disengaged from the locking link.

5. The walk-in and folding apparatus installed in a seat according to claim 4, wherein the cushion frame is provided with a latching groove, and when the folding lever is operated, the walk-in pin passes over the locking link upon folding the seat back frame, and is latched onto the latching groove, to maintain the seat in a folded state.

6. The walk-in and folding apparatus installed in a seat according to claim 1, wherein the cushion frame is provided with a latching groove, and when the folding lever is operated, the walk-in pin passes over the locking link upon folding the seat back frame, and is latched onto the latching groove, to maintain the seat in a folded state.

7. The walk-in and folding apparatus installed in a seat according to claim 1, wherein the seat back frame is provided with a first slot to slidably receive the walk-in pin therein, the walk-in pin being connected with the folding lever through the first slot by a second wire.

8. The walk-in and folding apparatus installed in a seat according to claim 1, wherein the recliner is coupled to a second slot formed in the folding lever by a link.

9. The walk-in and folding apparatus installed in a seat according to claim 1, wherein the folding lever is installed on a side end of the cushion frame through a hinge such that one end of the folding lever is connected with the recliner by a link, and is connected with the walk-in pin by a wire so as to, upon rotation, release the recliner and draw a second wire to rotate the walk-in pin.

10. The walk-in and folding apparatus installed in a seat according to claim 1, wherein the cushion frame is provided on both sides of the seat back frame with the recliners, each being fastened to the shaft, and includes a connection lever formed to the shaft, one end of the connection lever being connected to the walk-in-lever by a third wire, such that upon operation of the walk-in lever the recliners are released from the cushion frame.

11. The walk-in and folding apparatus installed in a seat according to claim 10, wherein the folding lever and the locking link are installed on one side of the cushion frame, a second side of which is provided with the connection lever configured to selectively connect the recliner with the cushion frame.

* * * * *